US008412876B2

(12) United States Patent
Yu (10) Patent No.: US 8,412,876 B2
(45) Date of Patent: Apr. 2, 2013

(54) STORAGE DEVICE WITH MULTIPLE STORAGE UNITS AND CONTROL METHOD THEREOF

(75) Inventor: Chun-Te Yu, Sijhih (TW)

(73) Assignee: Felicity Taiwan Corporation, Taipei (TW)

( * ) Notice: Subject to any disclaimer, the term of this patent is extended or adjusted under 35 U.S.C. 154(b) by 335 days.

(21) Appl. No.: 12/827,271

(22) Filed: Jun. 30, 2010

(65) Prior Publication Data

US 2012/0005468 A1 Jan. 5, 2012

(51) Int. Cl.
*G06F 13/00* (2006.01)
*G06F 1/32* (2006.01)
*G06F 1/00* (2006.01)

(52) U.S. Cl. ............ 710/316; 713/320; 713/324; 714/1; 714/6.2; 714/6.3

(58) Field of Classification Search ................ 710/8, 14, 710/74, 104, 305, 316; 713/300, 320, 323–324, 713/1, 2; 714/1, 4.11, 100, 6.1, 6.11, 6.2, 714/6.3
See application file for complete search history.

(56) References Cited

U.S. PATENT DOCUMENTS

| | | | | | |
|---|---|---|---|---|---|
| 5,269,022 | A | * | 12/1993 | Shinjo et al. | 713/2 |
| 5,559,764 | A | * | 9/1996 | Chen et al. | 709/217 |
| 5,928,367 | A | * | 7/1999 | Nelson et al. | 714/6.3 |
| 6,023,584 | A | * | 2/2000 | Barton et al. | 717/177 |
| 2002/0120836 | A1 | * | 8/2002 | Numata et al. | 713/2 |
| 2004/0019822 | A1 | * | 1/2004 | Knapp, III | 714/6 |
| 2004/0019824 | A1 | * | 1/2004 | McCombs | 714/13 |
| 2004/0153616 | A1 | * | 8/2004 | Nakamura et al. | 711/162 |
| 2005/0050392 | A1 | * | 3/2005 | Baba et al. | 714/25 |
| 2005/0210316 | A1 | * | 9/2005 | Benhase et al. | 714/6 |
| 2006/0259795 | A1 | * | 11/2006 | Tsai et al. | 713/300 |
| 2007/0038821 | A1 | * | 2/2007 | Peay | 711/162 |
| 2007/0055853 | A1 | * | 3/2007 | Hatasaki et al. | 713/1 |
| 2007/0074290 | A1 | * | 3/2007 | Kobayashi et al. | 726/24 |
| 2007/0225962 | A1 | * | 9/2007 | Brunet et al. | 703/23 |
| 2007/0239978 | A1 | * | 10/2007 | Bharathy et al. | 713/2 |
| 2008/0007860 | A1 | * | 1/2008 | Miyata et al. | 360/69 |
| 2009/0089343 | A1 | * | 4/2009 | Moore et al. | 707/205 |
| 2010/0142350 | A1 | * | 6/2010 | Chung et al. | 369/85 |
| 2010/0185842 | A1 | * | 7/2010 | Yu | 713/2 |
| 2012/0131323 | A1 | * | 5/2012 | Gattegno et al. | 713/2 |

FOREIGN PATENT DOCUMENTS

JP          11327811 A   * 11/1999

OTHER PUBLICATIONS

Panabaker, Ruston. "Hybrid Hard Disk and ReadyDrive™ Technology: Improving Performance and Power for Windows Vista Mobile PCs". Microsoft Corporation. 2006. Microsoft WinHEC 2006.*

* cited by examiner

*Primary Examiner* — Thomas J Cleary
(74) *Attorney, Agent, or Firm* — Litron Patents Trademark Office; Min-Lee Teng (57) ABSTRACT

A storage device with multiple storage units, which is applicable to a system end. The storage device is a hard disk drive (HDD) or solid state disk (SSD) with a standard size. The storage device includes a first storage unit and at least one memory storage unit. The memory storage unit and the first storage unit serve to back up and update each other. The storage device further includes a multiplex control unit and a power control unit connected to the multiplex control unit. According to the decision of the multiplex control unit, the power control unit controls turning on/off of the first storage unit and the memory storage unit.

11 Claims, 8 Drawing Sheets

STORAGE DEVICE WITH MULTIPLE STORAGE UNITS AND CONTROL METHOD THEREOF

FIELD OF THE INVENTION

The present invention relates to a storage device with multiple storage units and a control method thereof, and more particularly to a storage device including at least two storage units one of which is a memory storage unit.

BACKGROUND OF THE INVENTION

It is known that a personal computer employs hard disk drive (HDD) as a loading unit of the operation system. The hard disk drive is a non-volatile storage device based on rigid rotational disk. Digital data are stored on and searched from the smooth magnetic surface of the hard disk drive. The polarity is changed by the electromagnetic flow of a magnetic head, which is very close to the magnetic surface, so as to write the data onto the disk. The data can be read in a reverse manner. For example, the current of a coil is variable with a magnetic field when the magnetic head overpasses the coil.

Following the development of various electronic products, different standard sizes of hard disk drives have been developed and applied to the electronic products. For example, 0.85-inch hard disk drive is generally applied to a portable device such as a cellular phone, one-inch hard disk drive (MicroDrive) is generally applied to a digital camera (CF type II interface), 1.8-inch hard disk drive is generally applied to a notebook or an external hard disk cartridge, 2.5-inch hard disk drive is also generally applied to a notebook or an external hard disk cartridge, and 3.5-inch hard disk drive is generally applied to a desktop computer. The external hard disk cartridge for 3.5-inch hard disk drive needs to connect with an external power supply. This is inconvenient.

Lately, the hard disk drive is replaced with a permanent memory such as flash memory or a non-permanent such as synchronous dynamic random access memory (SDRAM). The external storage device based on such memory is referred to as solid state disk or solid state drive (SSD). The solid state disk is made with a configuration identical to that of a regular hard disk, for example, 1.8-inch, 2.5-inch or 3.5-inch hard disk drive. The solid state disk employs an interface compatible with that of the regular hard disk to replace the standard size of hard disk drive in the computer. There is no rotational disk-like structure in the solid state disk. However, such memory is still inherently named "hard disk".

The solid state disk is advantageous in that it has low power consumption and low heat and is noise-free and anti-vibration. Accordingly, not only the data can be more securely stored, but also the continuous operation time of the battery-powered device can be prolonged. However, the popularization of the solid state disk is most limited by the cost and lifetime. No matter whether the solid state disk is the permanent memory or non-permanent memory, the cost of the solid state disk per million bytes is much higher than that of the hard disk drive. Moreover, the flash RAM has a fixed write lifetime. When the lifetime expires, the data cannot be read. This is another obstacle to the popular acceptance of the solid state disk. Furthermore, it is hard to repair a damaged solid state disk. In case the flash memory chip for storing data is damaged, it is impossible to recover the data from the damaged chip with the existent data reparation technique. In contrast, the data may be more or less recovered from a conventional mechanical hard disk drive.

The advantages and shortcomings of the hard disk drive as an operation unit and the flash memory as an operation unit are compared as follows:

1. The hard disk drive has a major advantage of large memory capacity. With respect to the specification of a current hard disk drive product, 500 GB and 640 GB memories have already been mass-produced and the memory capacity will be even larger in the future. Such memory capacity is sufficient to most of the users. However, in comparison with the flash memory as a storage unit, the hard disk drive has many shortcomings including great power consumption, high temperature and great noise. The most serious defect of the hard disk drive is its poor stability. The spindle motor of a 2.5-inch hard disk drive generally can operate at 5400 rpm or 7200 rpm or even 10000 rpm. When operating at high speed, the hard disk drive is very likely to damage due to collision or shock. Once the tracks are damaged, the data recorded on the tracks are very likely to totally or 2. The flash memory is mainly advantageous in that it operates at higher speed and is noise-free (since it needs no motor). The flash memory is disadvantageous in that it has too small capacity and is manufactured at too high cost. Currently, one single flash memory chip has a capacity of about 8 GB or 16 GB. Therefore, it needs 40 flash memory chips to provide a capacity of 640 GB. However, 16 GB or 32 GB is large enough to simply store the operation system and the ordinary application software.

SUMMARY OF THE INVENTION

A primary object of the present invention is to provide a storage device, which is a hard disk drive or a solid state disk. The storage device includes a first storage unit and at least one memory storage unit in addition to the first storage unit as a first-priority boot execution unit. The memory storage unit and the first storage unit serve to back up and update each other.

A further object of the present invention is to provide the above storage device, in which one memory storage unit is powered on to serve as the boot execution unit, while the first storage unit and the other memory storage unit are powered off. Accordingly, the system can be booted at high speed to save energy and reduce noise. Moreover, the other storage units are powered off so that they are free from any virus and the risk of damage due to shock or collision.

A still further object of the present invention is to provide the above storage device, which has a boot execution unit and at least one backup execution unit. In case the boot execution unit is damaged, the storage device is immediately switched to the backup execution unit to replace the boot execution unit. Accordingly, the backup and boot can be executed without additional storage device.

A still further object of the present invention is to provide the above storage device, in which the interface unit is provided with at least one transmission interface. The multiplex control unit controls the respective storage units to use one transmission interface in common or controls each of the storage units to use a corresponding transmission interface.

A still further object of the present invention is to provide a control method of a storage device for controlling turning on/off of multiple storage units in the storage device.

To achieve the above and other objects, the storage device with multiple storage units of the present invention is applicable to a system end. The storage device includes: an interface unit electrically connected to the system end; a first storage unit having a software element including at least one operation system; at least one memory storage unit, the memory storage unit and the first storage unit serving to back up and update each other, the memory storage unit storing said software element and serving as a first-priority boot execution unit; a multiplex control unit, data being transmitted between the multiplex control unit and the system end via the interface unit, the multiplex control unit serving to access the software element stored in the first storage unit and the memory storage unit and generate a mode selection signal according to a working mode parameter; and a power control unit connected to the multiplex control unit, the first storage unit and the memory storage unit, whereby according to the mode selection signal, the power control unit controls turning on/off of the first storage unit and the memory storage unit.

In the above storage device, the interface unit is selected from the group consisting of Parallel ATA series, Serial ATA (SATA) series, SCSI series, USB series and SAS series. The operation mode selection unit further includes a synchronous update parameter. The multiplex control unit generates a synchronous update signal according to the synchronous update parameter. The first storage unit can be a mechanical hard disk or a memory-type hard disk. The mechanical hard disk includes a spindle motor for driving multiple media to rotate and multiple arm actuators. A head is disposed at one end of the arm actuator. The other end of the arm actuator is driven by a head positioner motor to make the head read/write data on the media. The memory storage unit includes a first memory storage unit as a first-priority boot execution unit.

In the above storage device, the first storage unit serves as a backup execution unit. The at least one memory storage unit includes a first memory storage unit and a second memory storage unit. The first memory storage unit serves as the first-priority boot execution unit. The second memory storage unit serves as a first backup execution unit.

The storage device is applied to an electronic equipment, which is connected to the multiplex control unit via the interface unit. The electronic equipment can be a computer or a portable device. The portable device can be a cellular phone, a personal digital assistant, a video camera or a digital camera.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
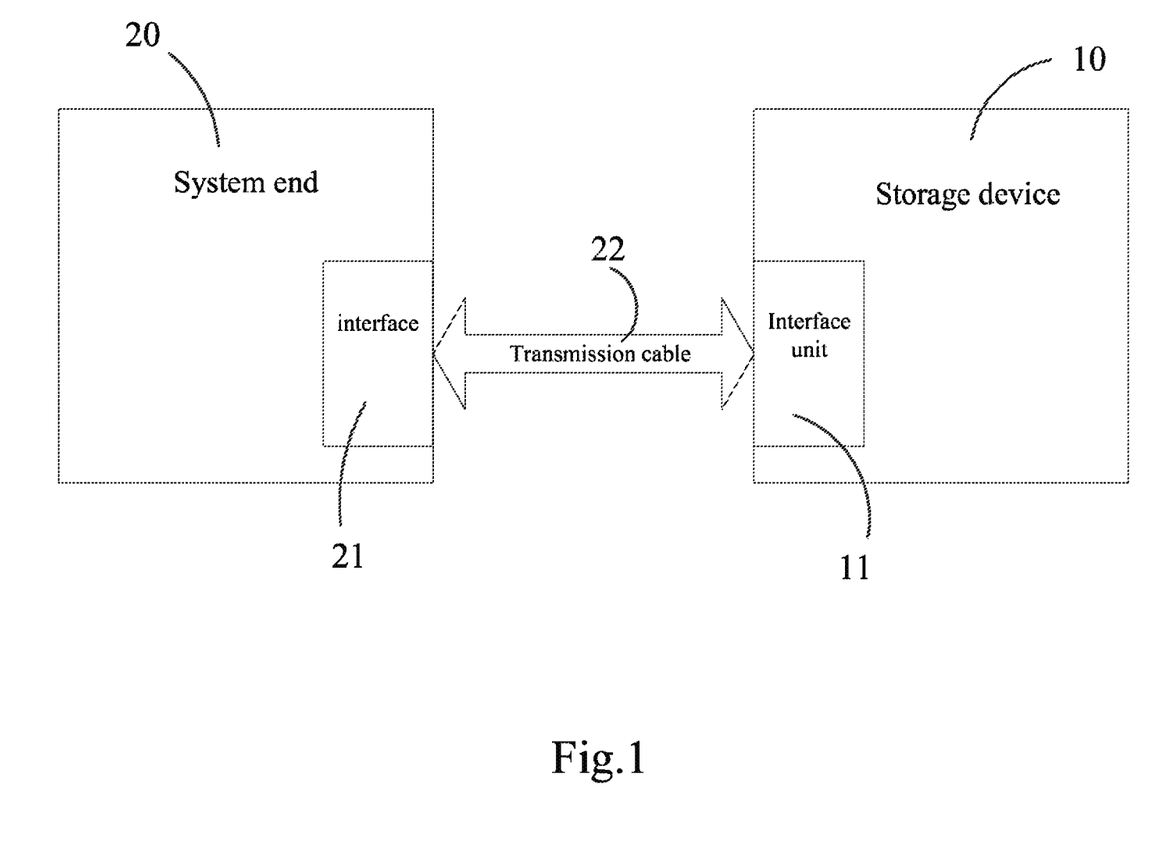
FIG. 1 is a block diagram of a preferred embodiment of the storage device of the present invention, showing that the storage device is connected to a system end.

Please refer to FIG. 1, which is a block diagram of a preferred embodiment of the storage device 10 with multiple storage units of the present invention. According to this embodiment, the storage device 10 is applicable to a system end 20. The system end 20 has an interface 21. The storage device 10 has an interface unit 11 connected to the interface 21 via a transmission cable 22. The storage device 10 is a hard disk drive (HDD) or solid state disk (SSD) with a standard size (such as 0.85 inch, one inch, 1.8 inches, 2.5 inches, 3.5 inches, etc.) Preferably, the system end 20 is an electronic equipment such as a computer or a portable device. The portable device can be a cellular phone, a personal digital assistant, a video camera or a digital camera.

Figure 2:
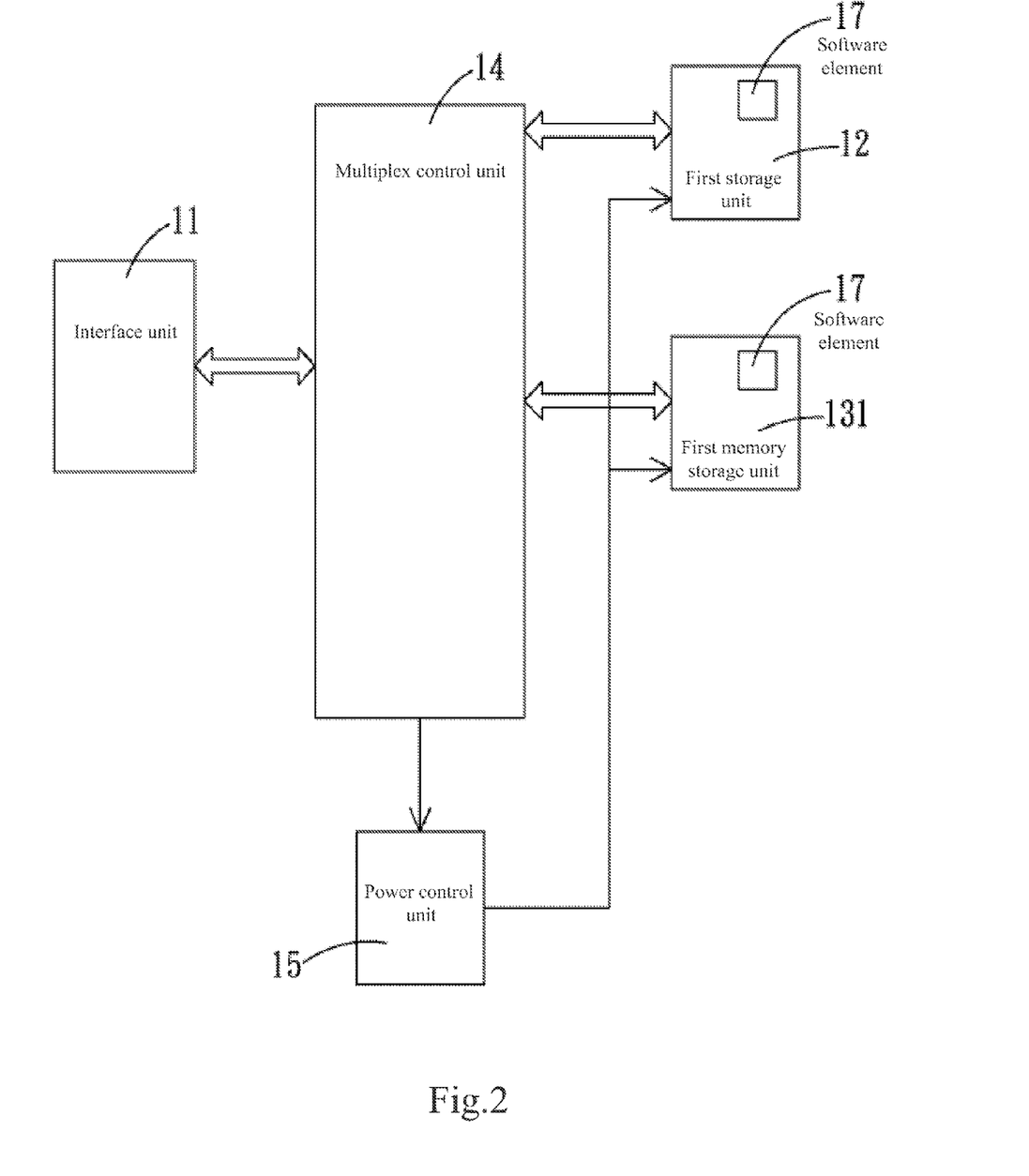
FIG. 2 is a block diagram of the storage device of the present invention, which has two storage units.

Please refer to FIG. 2. The storage device 10 mainly includes at least one interface unit 11, a first storage unit 12, at least one memory storage unit, a multiplex control unit 14 and a power control unit 15.

The interface unit 11 is electrically connected to the interface 21 of the system end 20. The interface unit 11 has at least one transmission interface, which is selected from the group consisting of Parallel ATA series, Serial ATA (SATA) series, SCSI series, USB series and SAS series, for example, SAS I and SAS II or USB1.0, USB2.0 and USB3.0 or SATA I, SATA II and SATA III.

In the present invention, the interface unit 11 of the storage device 10 can have only one transmission interface or two transmission interfaces or more than two transmission interfaces. The two or more than two transmission interfaces can be selected from the same series or different series. For example, one of the transmission interfaces is selected from SATA series, while the other is selected from USB series.

The first storage unit 12 has a software element 17 including at least one operation system, a driver, an application program and data. The first storage unit 12 can be a mechanical hard disk or a memory-type hard disk. In other words, in the case that the storage device 10 is a hard disk drive (HHD), then the first storage unit 12 is a mechanical hard disk.

The mechanical hard disk includes a spindle motor for driving multiple media to rotate and multiple arm actuators. A head is disposed at one end of the arm actuator. The other end of the arm actuator is driven by a head positioner motor to make the head read/write data on the media.

In the case of memory-type hard disk, the storage device 10 is a solid state drive (SSD). The memory can be a permanent memory such as flash memory or a non-permanent such as synchronous dynamic random access memory (SDRAM).

Referring to FIG. 2, the memory storage unit includes a first memory storage unit 131. The first memory storage unit 131 and the first storage unit 12 back up and update each other. The first memory storage unit 131 serves to store the aforesaid software element and serves as a first-priority boot execution unit. Under such circumstance, the first storage unit 12 serves as a backup execution unit. In case the first memory storage unit 131 fails to boot or gets a virus or crushes, the first storage unit 12 immediately boots to operate and reformat the first memory storage unit 131. In addition, the software element 17 in the first storage unit 12 is copied to the first memory storage unit 131. The preferred embodiment of the present invention is described with reference to FIG. 2.

Figure 3:
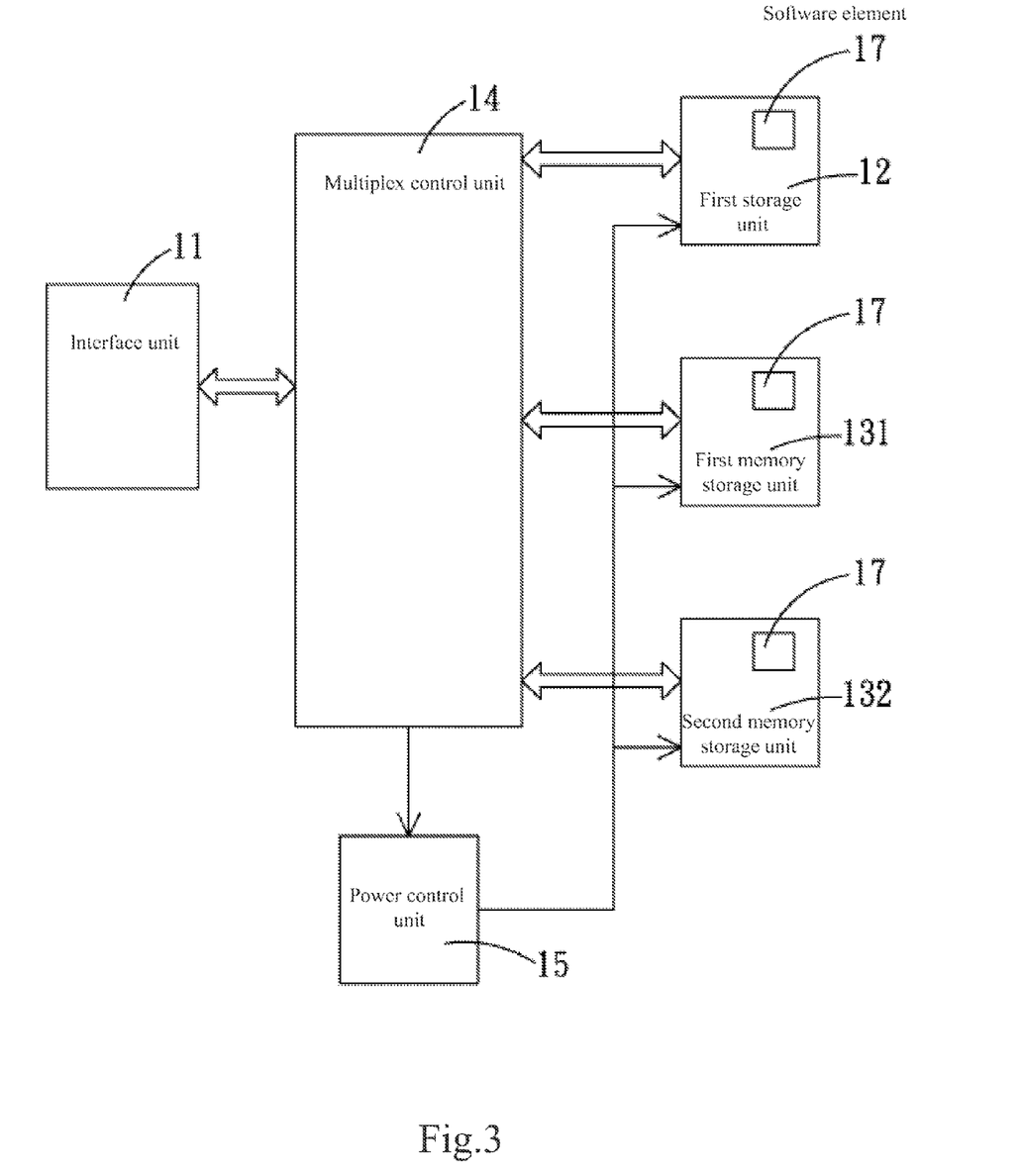
FIG. 3 is a block diagram of the storage device of the present invention, which has three storage units.

The present invention is not limited to the above embodiment. FIG. 3 shows another embodiment of the present invention, in which the memory storage unit includes a first memory storage unit 131 and a second memory storage unit 132. The first and second memory storage units 131, 132 and the first storage unit 12 back up and update each other. Preferably, the first memory storage unit 131 is a first-priority boot execution unit, the second memory storage unit 132 is a first backup execution unit and the first storage unit 12 is a second backup execution unit.

The multiplex control unit 14 is an IC processor including a control firmware and a control chip. Data are transmitted between the multiplex control unit 14 and the system end 20 via the interface unit 11. The multiplex control unit 14 also serves to access the software element stored in the first storage unit 12 and the memory storage unit (such as the first memory storage unit 131 and the second memory storage unit 132).

The multiplex control unit 14 includes multiple parameters inbuilt in the firmware. The parameters include working mode parameters, synchronous update parameters and three storage unit data backup parameters (as shown in Table 1). According to the working mode parameters (as shown in Table 1), the multiplex control unit 14 generates a mode selection signal. According to the synchronous update parameters (as shown in Table 1), the multiplex control unit 14 generates a synchronous update signal. The three storage unit data backup parameters are applied to a storage device 10 inbuilt with three storage units as shown in FIG. 3. This will be specifically described hereinafter.

TABLE 1 working mode parameters and synchronous update parameters

| working mode parameters | standard working mode parameter: will not control power sources of respective storage units intelligent working mode parameter: not only will control power sources of respective storage units, but also will activate synchronous update of data of storage units | |
|---|---|---|
| synchronous update parameters | timing parameter 1 | automatic update every 5 minutes |
| | timing parameter 2 | automatic update every 15 minutes |
| | timing parameter 3 | automatic update every 30 minutes |
| | timing parameter 4 | automatic update every hour |
| | ... | ... |
| | timing parameter N | automatic update every N hours |
| three storage unit data backup parameters | backup parameter 1 | backup of data of first memory storage unit and second memory storage unit |
| | backup parameter 2 | backup of data of three storage units at the same time |

According to the standard working mode parameter and the intelligent working mode parameter, the mode selection signal decides whether the storage device 10 works in the standard working mode or in the intelligent working mode. The synchronous update parameters are used in the intelligent working mode. According to the synchronous update parameters, the synchronous update signal decides the time of automatic synchronous update.

The power control unit 15 is preferably a power control IC connected to the multiplex control unit 14, the first storage unit 12 and the first memory storage unit 131. According to the mode selection signal generated by the multiplex control unit 14, the power control unit 15 controls turning on/off of the first storage unit 12 and the first memory storage unit 131.

Figure 4:
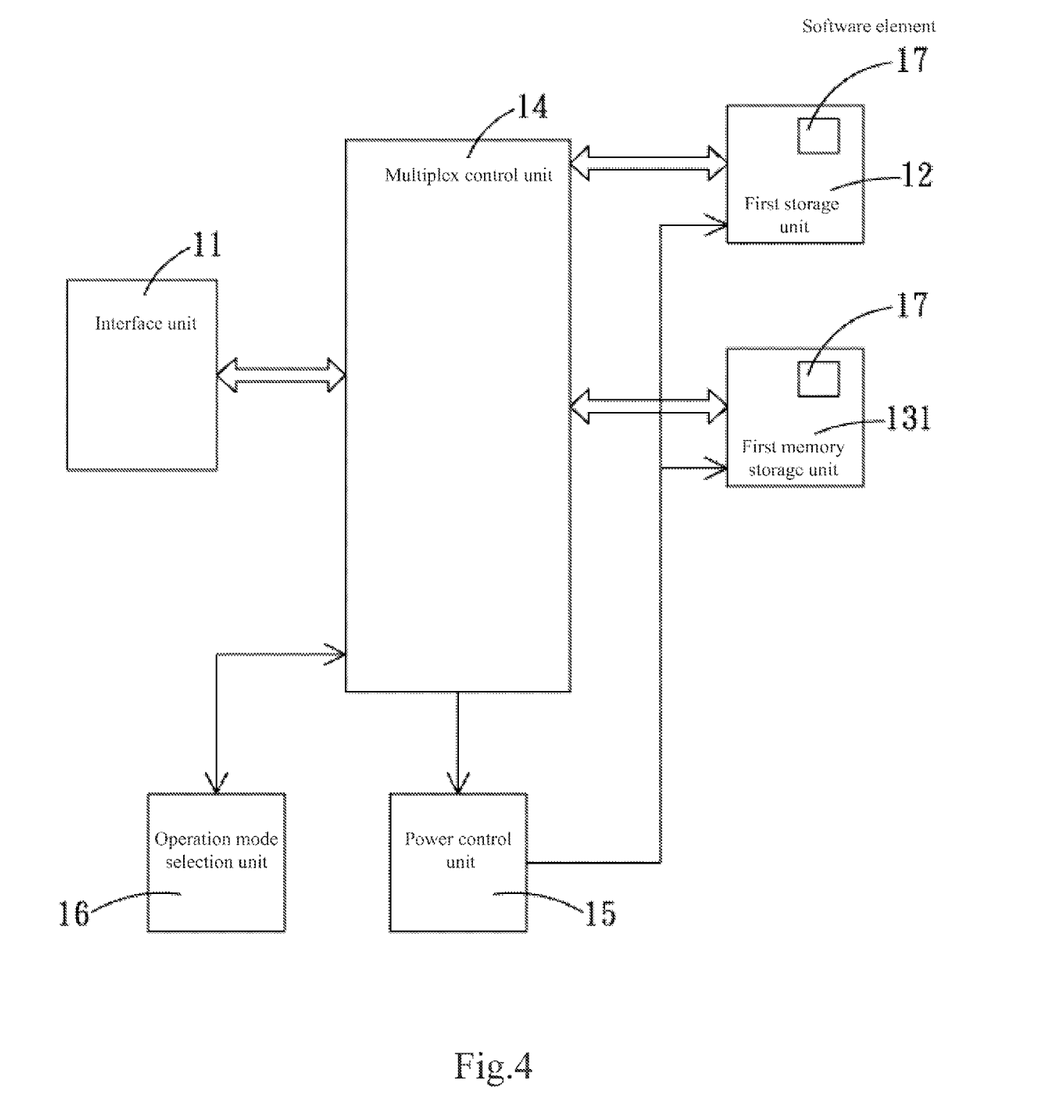
FIG. 4 is a block diagram of another embodiment of the storage device of the present invention, which further has an operation mode selection unit.

Referring to FIG. 1 and FIG. 4, which shows another embodiment of the present invention. This embodiment is substantially identical to the above embodiment. This embodiment is only different from the above embodiment in that the storage device 10 further includes an operation mode selection unit 16. Preferably, the operation mode selection unit 16 is an EEPROM IC connected to the multiplex control unit 14. The working mode parameters, synchronous update parameters and three storage unit data backup parameters (as shown in Table 1) are inbuilt in the operation mode selection unit 16, rather than in the firmware of the multiplex control unit 14.

According to the parameters inbuilt in the operation mode selection unit 16, the multiplex control unit 14 generates a mode selection signal and a synchronous update signal as in the first embodiment. The three storage unit data backup parameters are also applied to the storage device 10 inbuilt with three storage units.

Figure 5:
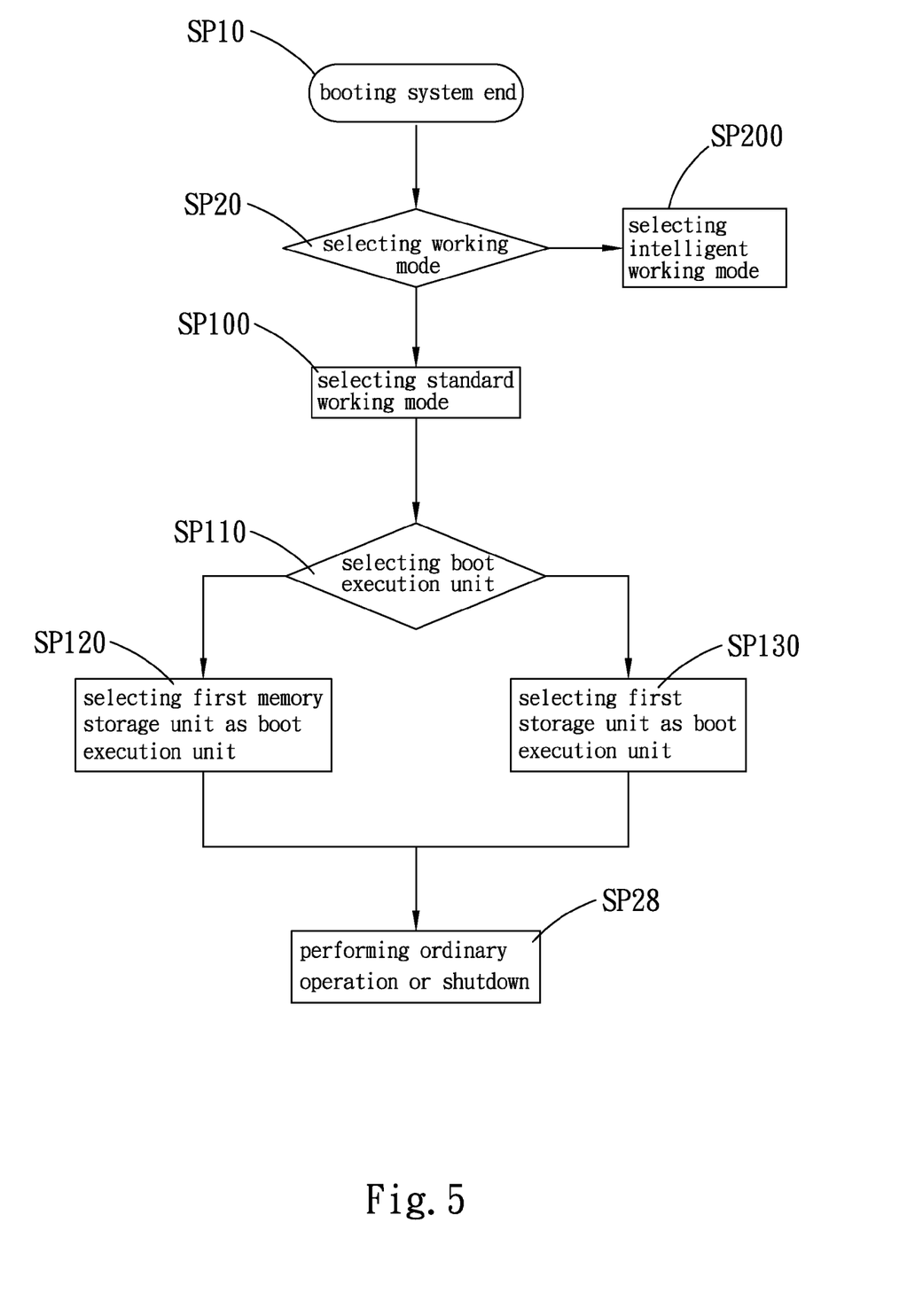
FIG. 5 is a flow chart of the control method of the storage device of the present invention.

Please now refer to FIGS. 1, 2 and 5. The control method of the storage device 10 includes:

step SP10 of booting the system end 20, the multiplex control unit 14 receiving a boot signal from the system end 20 to immediately make a self-check, the multiplex control unit 14 being connected to the system end 20 via the interface unit 11 and the transmission cable 22 to communicate with the system end 20 so as to identify the type of transmission interface that is used, the transmission interface being initially set to be SATA, while the multiplex control unit 14 being able to judge and switch the transmission interface into another type such as USB according to actual connection;

step SP20 of selecting working mode, the multiplex control unit 14 in the storage device 10 transmitting a mode selection requirement to the system end 20, the system end 20 selecting the working mode between the standard working mode and the intelligent working mode, the system end 20 being able to select the working mode in an environment of basic input/output system (BIOS) or operation system (OS) with an application program;

step SP100 of selecting the standard working mode, the multiplex control unit 14 sending information (including name of manufacturer, product model number and capacity) of the first storage unit 12 and the first memory storage unit 131 to the system end 20, whereby in this working mode, it is like multiple storage devices are connected to the system end 20 at the same time, for example, a personal computer is at the same time equipped with drive C (as the first memory storage unit 131) and drive D (as the first storage unit 12);

step SP110 of selecting boot execution unit, the system end 20 reading the first storage unit 12 and the first memory storage unit 131 and selecting one of the first storage unit 12 and the first memory storage unit 131 as the boot execution unit, preferably, the first memory storage unit 131 being a first-priority boot execution unit;

step SP120 of selecting the first memory storage unit 131 as the boot execution unit, via the interface unit 11, the multiplex control unit 14 transmitting the software element 17 in the first memory storage unit 131 to the system end 20 to complete the loading of operation system;

step SP130 of selecting the first storage unit 12 as the boot execution unit, via the interface unit 11, the multiplex control unit 14 transmitting the software element 17 in the first storage unit 12 to the system end 20 to complete the loading of operation system; and step SP28 of performing ordinary operation or shutdown.

After loading the operation system, according to the requirement of the system end 20, the storage device 10 can execute reading/writing operation with respect to the first storage unit 12 or the first memory storage unit 131. Alternatively, the system end 20 shuts down in the operation system to shut down the storage device 10.

Figure 6:
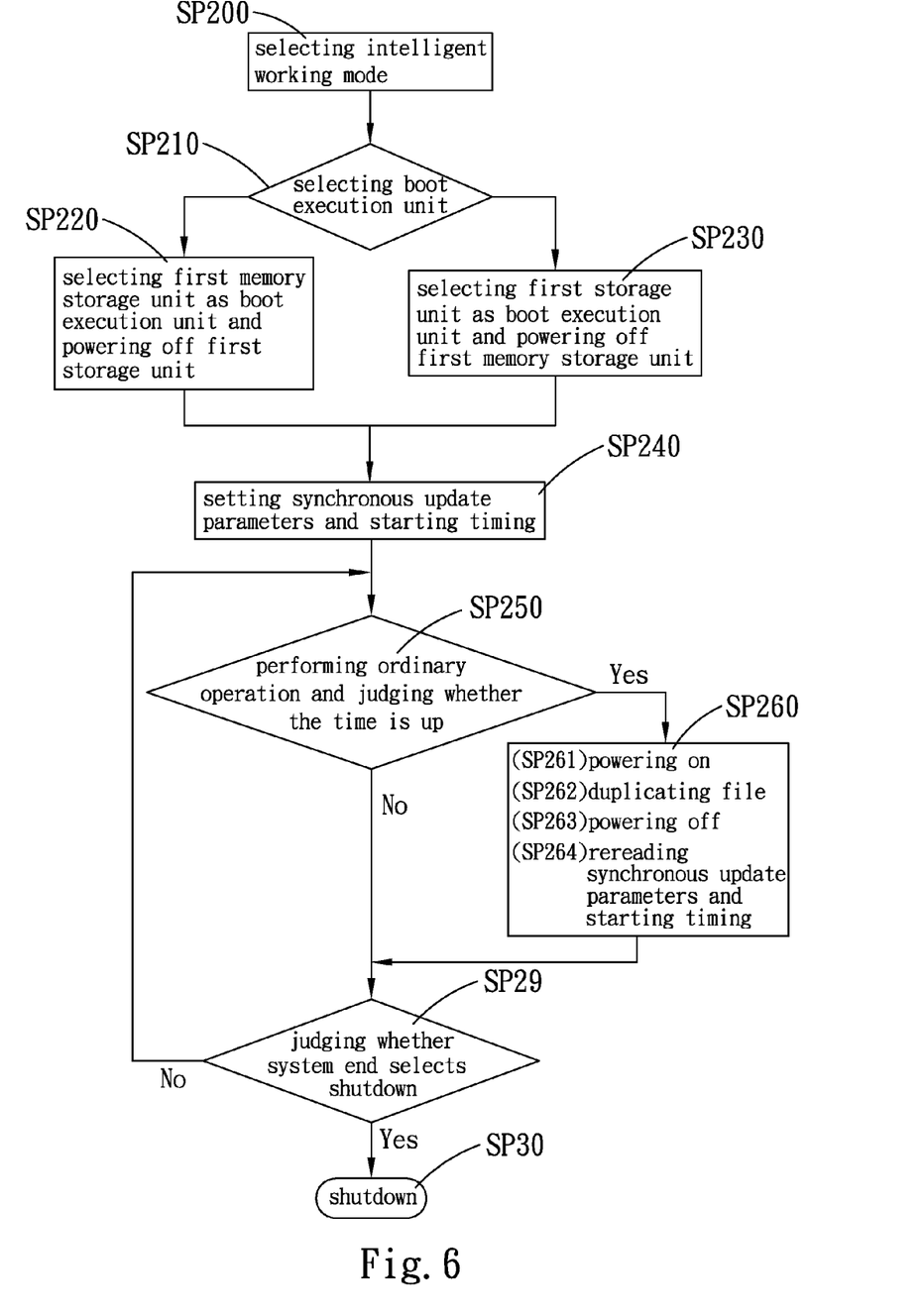
FIG. 6 is a flow chart of the intelligent control method of the storage device of the present invention.

Please now refer to FIGS. 1, 2 and 6. In the case that the system end 20 selects the intelligent working mode, the control method of the storage device 10 includes:

step SP200 of selecting the intelligent working mode, the multiplex control unit 14 sending information (including name of manufacturer, product model number and capacity) of the first storage unit 12 and the first memory storage unit 131 to the system end 20, whereby in this working mode, it is like multiple storage devices are connected to the system end 20 at the same time, for example, a personal computer is at the same time equipped with drive C (as the first memory storage unit 131) and drive D (as the first storage unit 12);

step SP210 of selecting boot execution unit, the system end 20 reading the first storage unit 12 and the first memory storage unit 131 and selecting one of the first storage unit 12 and the first memory storage unit 131 as the boot execution unit, preferably, the first memory storage unit 131 being a first-priority boot execution unit;

step SP220 of selecting the first memory storage unit 131 as the boot execution unit, via the power control unit 15, the multiplex control unit 14 powering on the first memory storage unit 131 and powering off the first storage unit 12, via the interface unit 11, the multiplex control unit 14 also transmitting the software element 17 in the first memory storage unit 131 to the system end 20 to complete the loading of operation system;

step SP230 of selecting the first storage unit 12 as the boot execution unit, via the power control unit 15, the multiplex control unit 14 powering on the first storage unit 12 and powering off the first memory storage unit 131, via the interface unit 11, the multiplex control unit 14 also transmitting the software element 17 in the first storage unit 12 to the system end 20 to complete the loading of operation system;

step SP240 of setting synchronous update parameters and starting timing, the synchronous update parameters being as shown in Table 1, the system end 20 setting the time corresponding to default automatic synchronous update parameters, the set time being variable in accordance with a user's requirement, according to the last set time corresponding to the automatic synchronous update parameters, a timer in the multiplex control unit 14 starting timing;

step SP250 of performing ordinary operation and judging whether the time is up, after loading the operation system, according to the requirement of the system end 20, the storage device 10 can execute reading/writing operation with respect to the first storage unit 12 or the first memory storage unit 131, when performing the ordinary operation, the multiplex control unit 14 judging whether the timer has counted to the corresponding time, if so, the process going to step SP260, if not, the process going to step SP29;

step SP260 of backup and update, the multiplex control unit 14 executing data duplication operation, the multiplex control unit 14 comparing file contents of the first storage unit 12 and the first memory storage unit 131 with each other to copy the new file or the file of the same name with latest data to one of the first storage unit 12 and the first memory storage unit 131, this being for immediately recovering the data of any of the first storage unit 12 and the first memory storage unit 131 in case of damage, step SP 260 including:

sub-step SP261 of powering on, the multiplex control unit 14 powering on the first storage unit 12 (or the first memory storage unit 131) and then executing sub-step SP262;

sub-step SP262 of duplicating the file, the latest updated file of the first memory storage unit 131 (or the first storage unit 12) being copied to the first storage unit 12 (or the first memory storage unit 131), then sub-step SP263 being executed;

sub-step SP263 of powering off, after the duplication is completed, the first storage unit 12 (or the first memory storage unit 131) being powered off, the sub-step SP264 being executed; and sub-step SP264 of rereading the synchronous update parameters (as shown in Table 1), then the process going to step SP29;

step SP29 of judging whether the system end 20 selects shutdown, the multiplex control unit 14 judging whether the system end 20 selects shutdown, if so, the process going to step SP30, if not, this meaning that the system end 20 being still performing the ordinary operation and the process going back to step SP250 of performing ordinary operation and judging whether the time is up; and step SP30 of shutdown, the system end 20 shuts down in the operation system to shut down the storage device 10.

Figure 7:
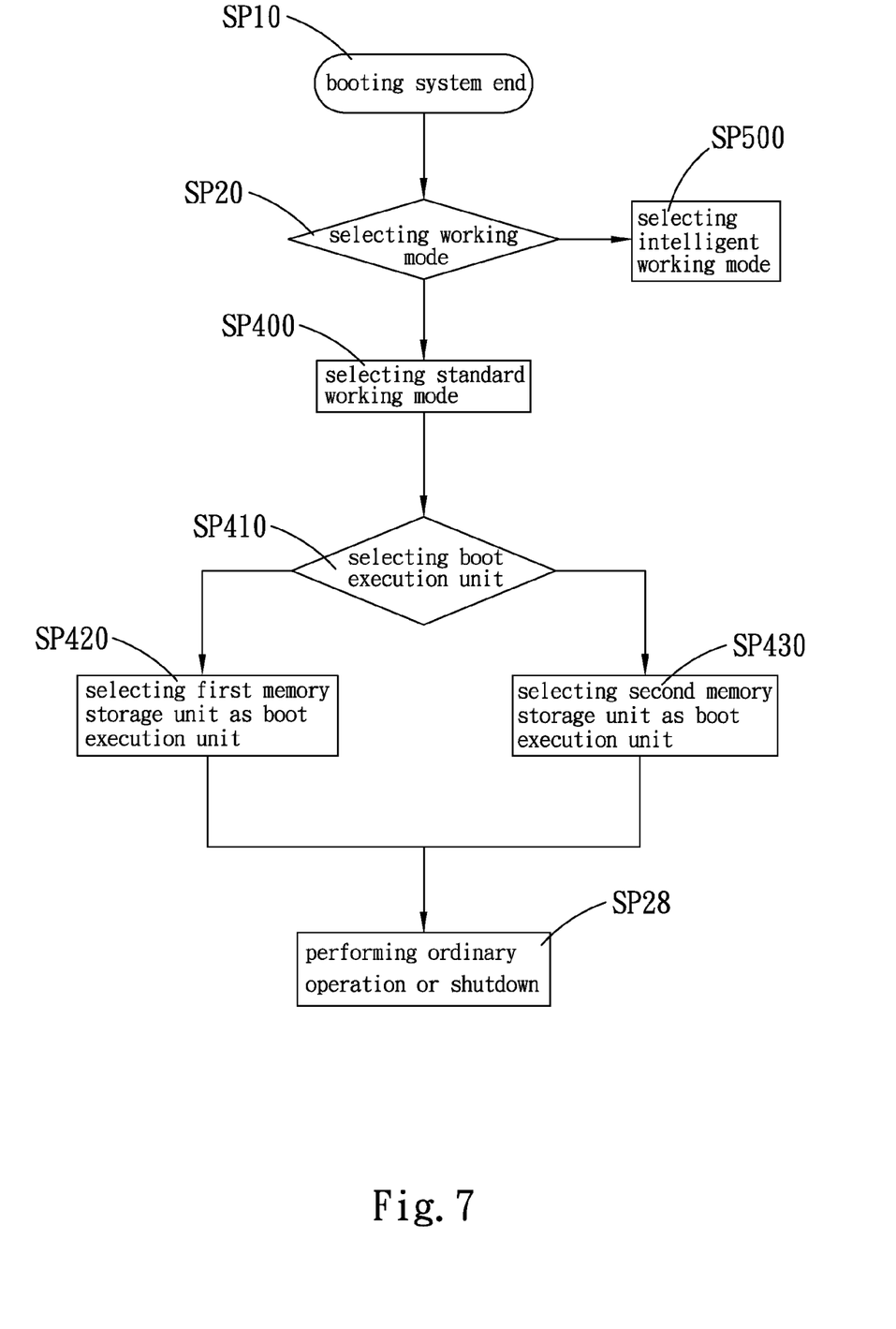
FIG. 7 is a flow chart of the control method of the storage device with three storage units of the present invention.

Please now refer to FIGS. 1, 3 and 7. The control method of the storage device 10 with the first memory storage unit 131, the second memory storage unit 132 and the first storage unit 12 includes:

step SP10 of booting the system end 20, the multiplex control unit 14 receiving a boot signal from the system end 20 to immediately make a self-check, the multiplex control unit 14 being connected to the system end 20 via the interface unit 11 and the transmission cable 22 to communicate with the system end 20 so as to identify the type of transmission interface that is used, the transmission interface being initially set to be SATA, while the multiplex control unit 14 being able to switch the transmission interface into another type such as USB according to actual connection;

step SP20 of selecting working mode, the multiplex control unit 14 in the storage device 10 transmitting a mode selection requirement to the system end 20, the system end 20 selecting the working mode between the standard working mode and the intelligent working mode, the system end 20 being able to select the working mode in an environment of basic input/output system (BIOS) or operation system (OS) with an application program;

step SP400 of selecting the standard working mode, the multiplex control unit 14 sending information (including name of manufacturer, product model number and capacity) of the first storage unit 12, the first memory storage unit 131 and the second memory storage unit 132 to the system end 20, whereby in this working mode, it is like multiple storage devices are connected to the system end 20 at the same time, for example, a personal computer is at the same time equipped with drive C (as the first memory storage unit 131), drive D (as the second storage unit 132) and drive E (as the first storage unit 12);

step SP410 of selecting boot execution unit, the system end 20 reading the first storage unit 12, the first memory storage unit 131 and the second memory storage unit 132 and selecting one of the first storage unit 12, the first memory storage unit 131 and the second memory storage unit 132 as the boot execution unit, preferably, the first memory storage unit 131 being a first-priority boot execution unit;

step SP420 of selecting the first memory storage unit 131 as the boot execution unit, via the interface unit 11, the multiplex control unit 14 transmitting the software element 17 in the first memory storage unit 131 to the system end 20 to complete the loading of operation system;

step SP430 of selecting the second memory storage unit 132 as the boot execution unit, via the interface unit 11, the multiplex control unit 14 transmitting the software element 17 in the second memory storage unit 132 to the system end 20 to complete the loading of operation system;

step SP28 of performing ordinary operation or shutdown.

After loading the operation system, according to the requirement of the system end 20, the storage device 10 can execute reading/writing operation with respect to the first memory storage unit 131 or the second memory storage unit 132. Alternatively, the system end 20 shuts down in the operation system to shut down the storage device 10.

Figure 8:
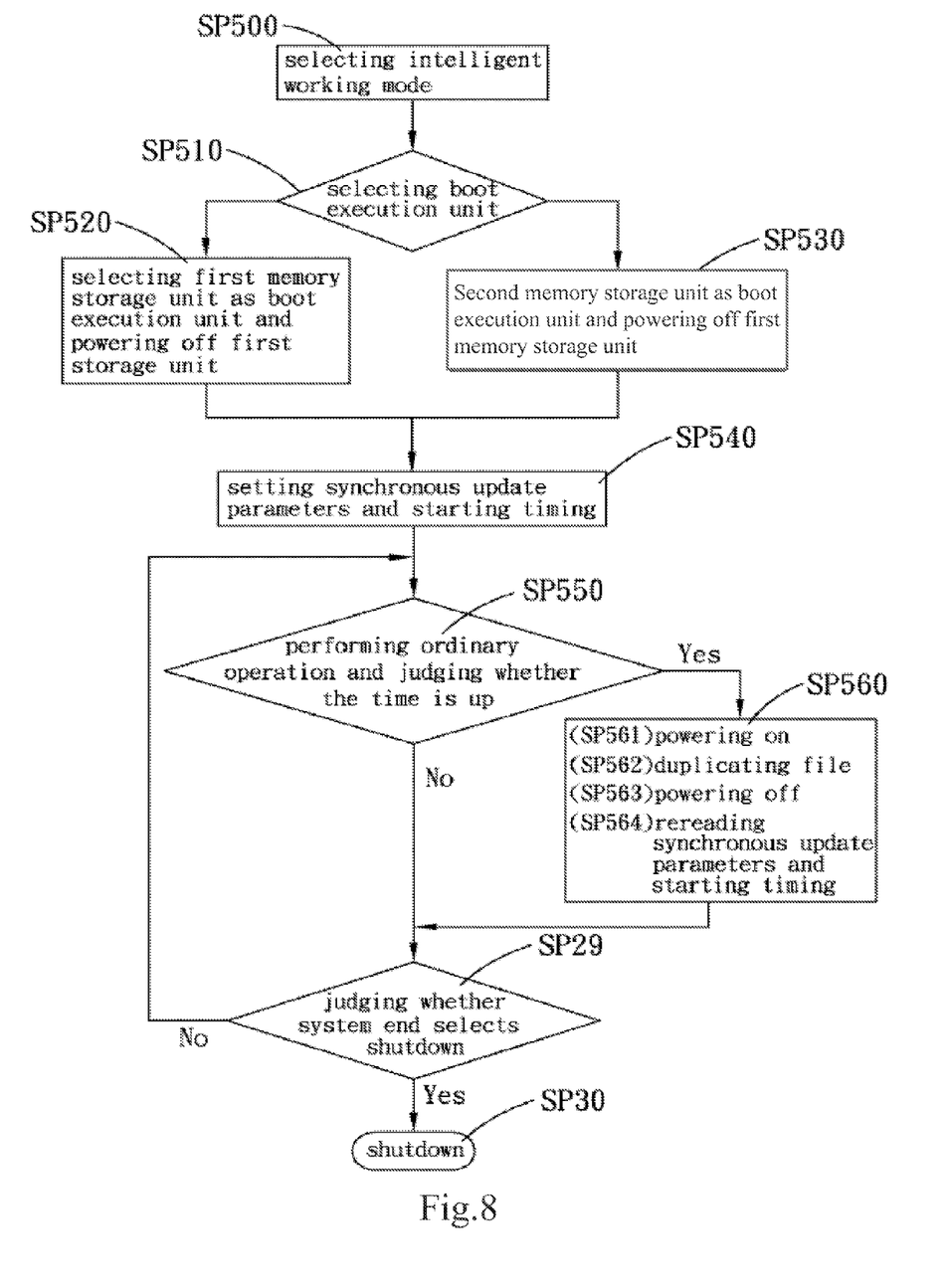
FIG. 8 is a flow chart of the intelligent control method of the storage device with three storage units of the present invention.

Please now refer to FIGS. 1, 3 and 8. In the case that the system end 20 selects the intelligent working mode, the control method of the storage device 10 with the first memory storage unit 131, the second memory storage unit 132 and the first storage unit 12 includes:

step SP500 of selecting the intelligent working mode, the multiplex control unit 14 sending information (including name of manufacturer, product model number and capacity) of the first storage unit 12, the first memory storage unit 131 and the second memory storage unit 132 to the system end 20, whereby in this working mode, it is like multiple storage devices are connected to the system end 20 at the same time, for example, a personal computer is at the same time equipped with drive C (as the first memory storage unit 131), drive D (as the second memory storage unit 132 and drive E (as the first storage unit 12);

step SP510 of selecting boot execution unit, the system end 20 reading the first storage unit 12, the first memory storage unit 131 and the second memory storage unit 132 and selecting one of the first storage unit 12, the first memory storage unit 131 and the second memory storage unit 132 as the boot execution unit, preferably, the first memory storage unit 131 being a first-priority boot execution unit;

step SP520 of selecting the first memory storage unit 131 as the boot execution unit, via the power control unit 15, the multiplex control unit 14 powering on the first memory storage unit 131 and powering off the first storage unit 12 and the second memory storage unit 132, via the interface unit 11, the multiplex control unit 14 also transmitting the software element 17 in the first memory storage unit 131 to the system end 20 to complete the loading of operation system;

step SP530 of selecting the second memory storage unit 132 as the boot execution unit, via the power control unit 15, the multiplex control unit 14 powering on the second memory storage unit 132 and powering off the first storage unit 12 and the first memory storage unit 131, via the interface unit 11, the multiplex control unit 14 also transmitting the software element 17 in the second memory storage unit 132 to the system end 20 to complete the loading of operation system;

step SP540 of setting synchronous update parameters and starting timing, the synchronous update parameters being as shown in Table 1, the system end 20 setting the time corresponding to default automatic synchronous update parameters, the set time being variable in accordance with a user's requirement, according to the last set time corresponding to the automatic synchronous update parameters, a timer in the multiplex control unit 14 starting timing;

step SP550 of performing ordinary operation and judging whether the time is up, after loading the operation system, according to the requirement of the system end 20, the storage device 10 can execute reading/writing operation with respect to the first storage unit 12, the first memory storage unit 131 or the second memory storage unit 132, when performing the ordinary operation, the multiplex control unit 14 judging whether the timer has counted to the corresponding time, if so, the process going to step SP560, if not, the process going to step SP29;

step SP560 of backup and update, the multiplex control unit 14 executing data duplication operation and making a backup according to the three storage unit data backup parameters of Table 1, according to the back parameter 1, the first memory storage unit 131 and the second memory storage unit 132 backing up each other and the first storage unit 12 being not operated, according to the back parameter 2, the first storage unit 12, the first memory storage unit 131 and the second memory storage unit 132 backing up each other and all these three storage units being operated, the multiplex control unit 14 comparing file contents of the first storage unit 12, the first memory storage unit 131 and the second memory storage unit 132 with each other to copy the new file or the file of the same name with latest data of any of the storage units to the other two storage units, this being for immediately recovering the data of any of the storage units in case of damage, according to the back parameter 1, the multiplex control unit 14 executing the following sub-steps:

sub-step SP561 of powering on, the multiplex control unit 14 powering on the second memory storage unit 132 (or the first memory storage unit 131) and then executing sub-step SP562;

sub-step SP562 of duplicating the file, the latest updated file of the first memory storage unit 131 (or the second memory storage unit 132) being copied to the second memory storage unit 132 (or the first memory storage unit 131), then sub-step SP263 being executed;

sub-step SP563 of powering off, after the duplication is completed, the second memory storage unit 132 (or the first memory storage unit 131) being powered off; and sub-step SP564 of rereading the synchronous update parameters (as shown in Table 1), then the process going to step SP29, according to the back parameter 2, the multiplex control unit 14 executing the following sub-steps:

sub-step SP561 of powering on, the multiplex control unit 14 powering on the first storage unit 12 and the second memory storage unit 132 (or the first memory storage unit 131) and then executing sub-step SP562;

sub-step SP562 of duplicating the file, the latest updated file of the first memory storage unit 131 (or the second memory storage unit 132) being copied to the first storage unit 12 and the second memory storage unit 132 (or the first memory storage unit 131), then sub-step SP563 being executed;

sub-step SP563 of powering off, after the duplication is completed, the first storage unit 12 and the second memory storage unit 132 (or the first memory storage unit 131) being powered off; and sub-step SP564 of rereading the synchronous update parameters (as shown in Table 1), then the process going to step SP29;

step SP29 of judging whether the system end 20 selects shutdown, the multiplex control unit 14 judging whether the system end 20 selects shutdown, if so, the process going to step SP30, if not, this meaning that the system end 20 being still performing the ordinary operation and the process going back to step SP550 of performing ordinary operation and judging whether the time is up; and step SP30 of shutdown, the system end 20 shuts down in the operation system to shut down the storage device 10.

The above two working modes can be set in many manners. For example, the working modes can be set in the following manners:

1. The storage device 10 is preset with the working mode before released from the factory.
2. The working mode can be set or changed under the command of the system end. The system end generally gives the command to set the working mode by one of the following two ways: 1. The working mode can be set in the basic input/output system (BIOS). 2. The working mode can be set in the operation system (OS) with an application program.

In conclusion, the present invention has the following advantages:

1. In the storage device 10 of the present invention, at least one memory storage unit is disposed in addition to the first storage unit 12 as the
2. One memory storage unit (such as the first memory storage unit 131) is powered on to serve as the boot execution unit, while the first storage unit 12 and the other memory storage unit (such as the second memory storage unit 132) are powered off. Accordingly, the system can be booted at high speed to save energy and reduce noise. Moreover, the other storage units are powered off so that they are free from any virus and the risk of damage due to shock or collision.
3. The storage device 10 has a boot execution unit and at least one backup execution unit. In the case that the boot execution unit is damaged, the storage device 10 is immediately switched to the backup execution unit to replace the boot execution unit. Accordingly, the backup and boot can be executed without additional storage device.
4. The interface unit 11 of the storage device 10 is provided with at least one transmission interface. The multiplex control unit controls the respective storage units to use one transmission interface in common or controls each of the storage units to use a corresponding transmission interface.
5. The present invention provides a control method in two working modes to control multiple storage units in the storage device 10.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A storage device for data accessing, comprising:
    a hard drive interface, for connecting to a system end;
    a first solid-state storage unit, which is made of non-volatile memory devices, for storing data;
    a second storage unit, which is made of magnetic disks, for storing data; and
    a multiplex control unit, for multiplexing data from the first solid-state storage unit or the second storage unit to the system end via the hard drive interface, wherein each of the first solid-state storage unit and the second storage unit is configured and visible to the system end as an independent drive via the hard drive interface.

2. The storage device as claimed in claim 1, wherein the storage device is housed in a standard form factor of a hard drive, wherein the first solid-state storage unit is configured as Drive C: and the second storage unit is configured as Drive D:.

3. The storage device as claimed in claim 1, wherein the first solid-state storage unit is powered by a first power source and the second storage unit is powered by a second power source, further comprising a power control unit for turning on/off the first power source and the second power source, wherein the second power source is turned off and the system end boots from the first solid-state storage unit, in a first working mode.

4. The storage device as claimed in claim 3, wherein the second storage unit is powered on repeatedly based on a time schedule to synchronize the data in the second storage unit to the data in the first solid-state storage unit, wherein the time schedule is derived according to a first set of parameters configured through the system end and transmitted to the storage device via the hard drive interface.

5. The storage device as claimed in claim 3, wherein the first working mode is selected according to a mode parameter configured through the system end and transmitted to the storage device via the hard drive interface.

6. The storage device as claimed in claim 3, wherein the second storage unit is powered on for executing the booting when the first solid-state storage unit fails in executing the booting in the first working mode.

7. The storage device as claimed in claim 3, wherein the time schedule is transmitted to the multiplex control unit of the storage device via the hard drive interface, wherein the multiplex control unit executes backup operations independent of the system end.

8. The storage device as claimed in claim 1, wherein the first solid-state storage unit serves as the first-priority boot execution unit, and the second storage unit serves as a backup execution unit.

9. The storage device as claimed in claim 1, wherein the system end and the storage device are housed in an electronic equipment.

10. The storage device as claimed in claim 1, further comprising a third solid-state storage unit, which is made of non-volatile memory devices, for storing data.

11. The storage device as claimed in claim 10, wherein the first solid-state storage unit serves as the first-priority boot execution unit, the third solid-state storage unit serves as a first backup execution unit, and the second storage unit serves as a second backup execution unit.

* * * * *